United States Patent [19]
Furuno

[11] Patent Number: 5,724,667
[45] Date of Patent: Mar. 3, 1998

[54] PORTABLE TELEPHONE HAVING REMOVABLE TRANSDUCER

[75] Inventor: Hiroshi Furuno, Tokyo, Japan

[73] Assignee: Sony Corporation, Tokyo, Japan

[21] Appl. No.: 889,085

[22] Filed: Jul. 7, 1997

Related U.S. Application Data

[63] Continuation of Ser. No. 341,804, Nov. 18, 1994, abandoned.

[30] Foreign Application Priority Data

Nov. 19, 1993 [JP] Japan ..................... 5-314287

[51] Int. Cl.$^6$ ..................................... H04B 1/38
[52] U.S. Cl. .................... 455/575; 455/90; 455/569; 379/422; 379/424; 381/123
[58] Field of Search .................... 455/90, 550, 569, 455/575, 100, 95, 128; 379/422, 431, 424, 425, 430, 428, 433; 242/398, 385, 385.2; 381/123, 74

[56] References Cited

U.S. PATENT DOCUMENTS

| | | | |
|---|---|---|---|
| 3,824,465 | 7/1974 | Blough | 325/16 |
| 3,904,843 | 9/1975 | Kendechy | 200/153 |
| 4,845,772 | 7/1989 | Metroka | 379/61 |

FOREIGN PATENT DOCUMENTS 3263957  11/1991  Japan.

*Primary Examiner*—Reinhard J. Eisenzopf
*Assistant Examiner*—Darnell R. Armstrong
*Attorney, Agent, or Firm*—Jerry A. Miller; Lise A. Rode, Esq.

[57] ABSTRACT

A portable telephone includes a main body of the telephone, a transducer (preferably an earphone) contained in the main body so that it can be removed therefrom, a cord connecting the transducer and the main body, and a switching mechanism. The portable telephone further comprises transmitting means and a transmission/reception circuit. In one embodiment of the present invention, the switching mechanism switches between an off-hook state and an on-hook state in conjunction with the removing and containing of the transducer from and into the main body of the telephone preferably through the delivery or taking up of the cord from and into the main body of the telephone. In a second embodiment, the portable telephone further includes a hinged lid which is rotatably supported to close an opening provided in the main body. The hinged lid preferably has a protuberance thereon so that when the hinged lid is opened and closed, the projection causes the switching mechanism to place the telephone in an off-hook and on-hook state, respectively.

3 Claims, 8 Drawing Sheets

PORTABLE TELEPHONE HAVING REMOVABLE TRANSDUCER

This is a continuation of application Ser. No. 08/341,804 filed on Nov. 18, 1994, now abandoned, which is hereby incorporated by reference.

BACKGROUND OF THE INVENTION

1. Field of the Invention

The present invention relates to portable telephones and, more particularly, to a portable telephone wherein the transducer can be taken out from and installed into the main body thereof.

2. Description of the Related Arts

Wireless portable telephones utilizing radio communication techniques have been widely spreading. It is preferable that portable telephones are made compact and lightweight for ease of carrying them around. Therefore, portable telephones having more compact cabinets have recently been proposed.

However, if a cabinet is too small, the distance between the speaker and microphone therein is smaller than the distance between an ear and the mouth of a person. This results in both reduced operability and reduced communication quality. Under such circumstances, various small portable telephones have been provided, including those having a cabinet which is divided into two parts to be foldable substantially in the middle thereof so that it can be opened when used and folded in the middle when carried around, and a flip type wherein a lid portion incorporating only the area of a microphone is opened and closed.

Portable telephones having the structure wherein a cabinet is divided into two parts in order to be foldable, or having a flip type structure can be made more compact than portable telephones having an integral-type cabinet and are easier to carry. However, portable telephones constructed to be foldable in the middle thereof have a problem in that their dimensions in the direction of the thickness thereof are increased when folded. Flip type portable telephones have potential problems with their strength such as insufficient mechanical strength at a hinge portion between the portion containing a microphone and a main body portion.

General type portable telephones wherein keys and indicators are provided on the main bodies thereof have problems in that the keys and indicators are not visible during communication and in that the efficiency of the antenna thereof is reduced because the antenna is closer to the face of a user than other types.

Taking the above-described situation into consideration, there have been provided portable telephones used with a headset which is provided separately from the main body as an accessory and which is constituted by a headphone including a microphone. Such telephones which are used with a headset have a problem not only in that portability is not so good but also in that handling becomes complicated because the headset must be attached to the main body each time communication is attempted.

SUMMARY OF THE INVENTION

It is therefore an object of the present invention to provide a portable telephone which resolves the abovementioned problems.

According to the present invention, there is provided a portable telephone including a transducer, a main body, a cord, and a switching mechanism. The main body contains the transducer so that the transducer can be taken out. The cord provides connection between the transducer and the main body. The switching mechanism allows switching between an on-hook state and an off-hook state in conjunction with taking out and inserting the transducer from and into the main body.

According to the present invention, there is provided a portable telephone including a transducer, a main body, a cord, a take-up mechanism, and a switching mechanism. The main body contains the transducer so that the transducer can be taken out. The cord provides connection between the transducer and the main body. The take-up mechanism takes up the cord into the main body. The switching mechanism allows switching between an on-hook state and an off-hook state in conjunction with the rolling pulling out of the cord from the main body and taking up of the cord by the take-up mechanism.

According to the present invention, there is provided a portable telephone including a transducer, a main body, a cord, and a switching mechanism. The main body has a containing portion and an opening/closing member. The containing portion contains the transducer so that the handset can be taken out. The cord provides connection between the transducer and the main body. The opening/closing member is attached so that it can be opened and closed to close the containing portion with the transducer contained therein. The cord provides connection between the transducer and the main body. The switching mechanism allows switching between an on-hook state and an off-hook state in conjunction with the opening and closing of the opening/closing member.

According to the present invention, taking out the transducer from the main body of the telephone set or pulling out the cord from the main body will automatically switch the telephone to an off-hook state. This makes it possible to provide a portable telephone having excellent operability.

DETAILED DESCRIPTION OF THE PREFERRED EMBODIMENTS

Figure 1:
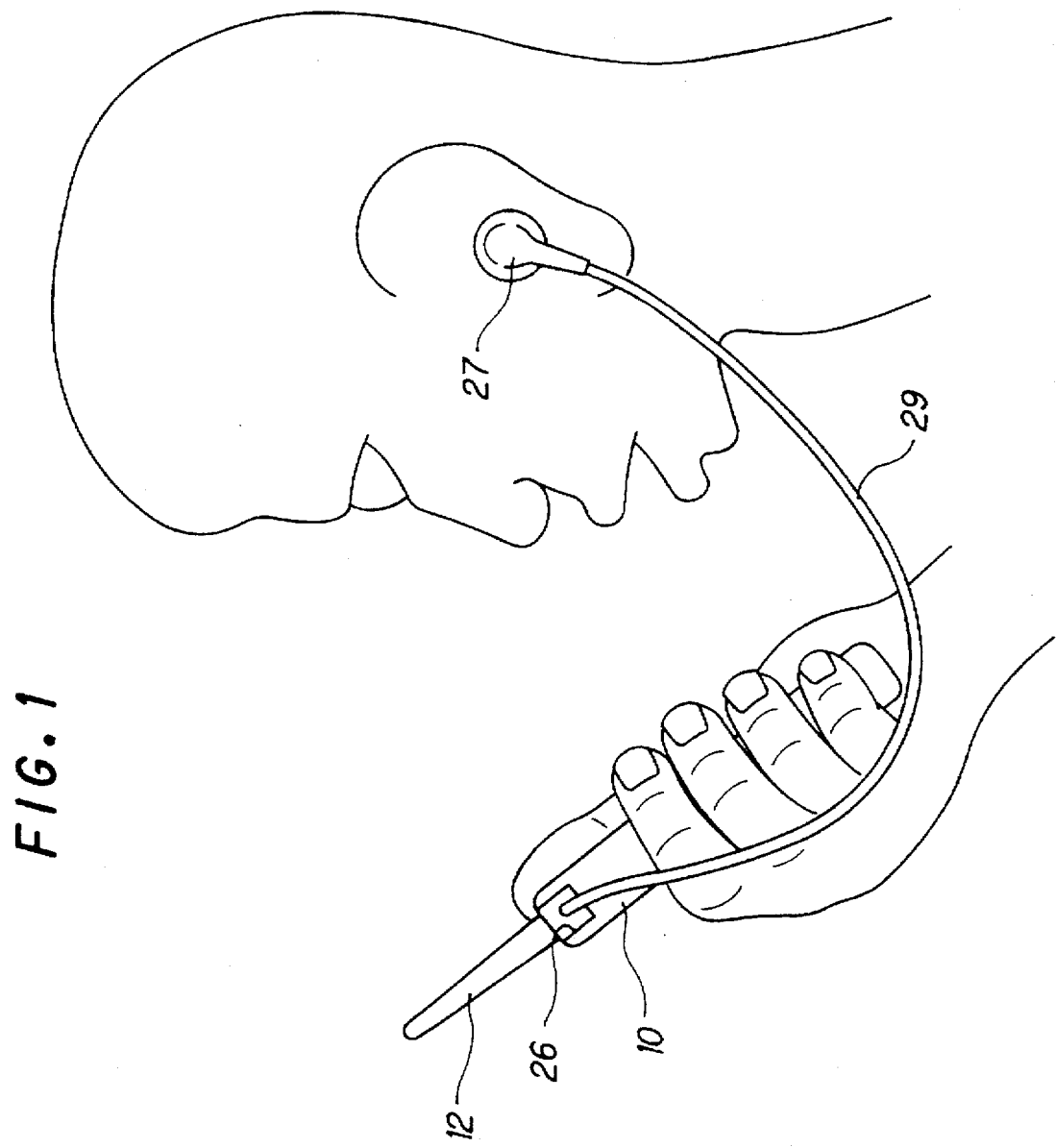
FIG. 1 is a side view of a portable telephone according to a first embodiment of the present invention illustrating the how it is used.

FIG. 1 illustrates how a portable telephone according to a first embodiment of the present invention is used. As shown in more detail in FIG. 2, the portable telephone has a main body 10 which is housed in a cabinet 11 preferably in the form of a flat rectangular parallelepiped. An antenna 12 is provided on the top of the main body 10 so that it projects from the main body 10. Furthermore a display portion 13, a power supply switch 14, and a plurality of key switches 15 are provided on the front face of the cabinet 11. The display portion 13 is made of, for example, liquid crystal display elements. Further, slits 16 are formed at a lower portion of the front face of the cabinet 11. A microphone 17 is mounted to the internal surface of the cabinet 11 at the portion wherein the slits 16 are formed. Information such as telephone numbers are input by a user with the plurality of key switches 15.

Figure 3:
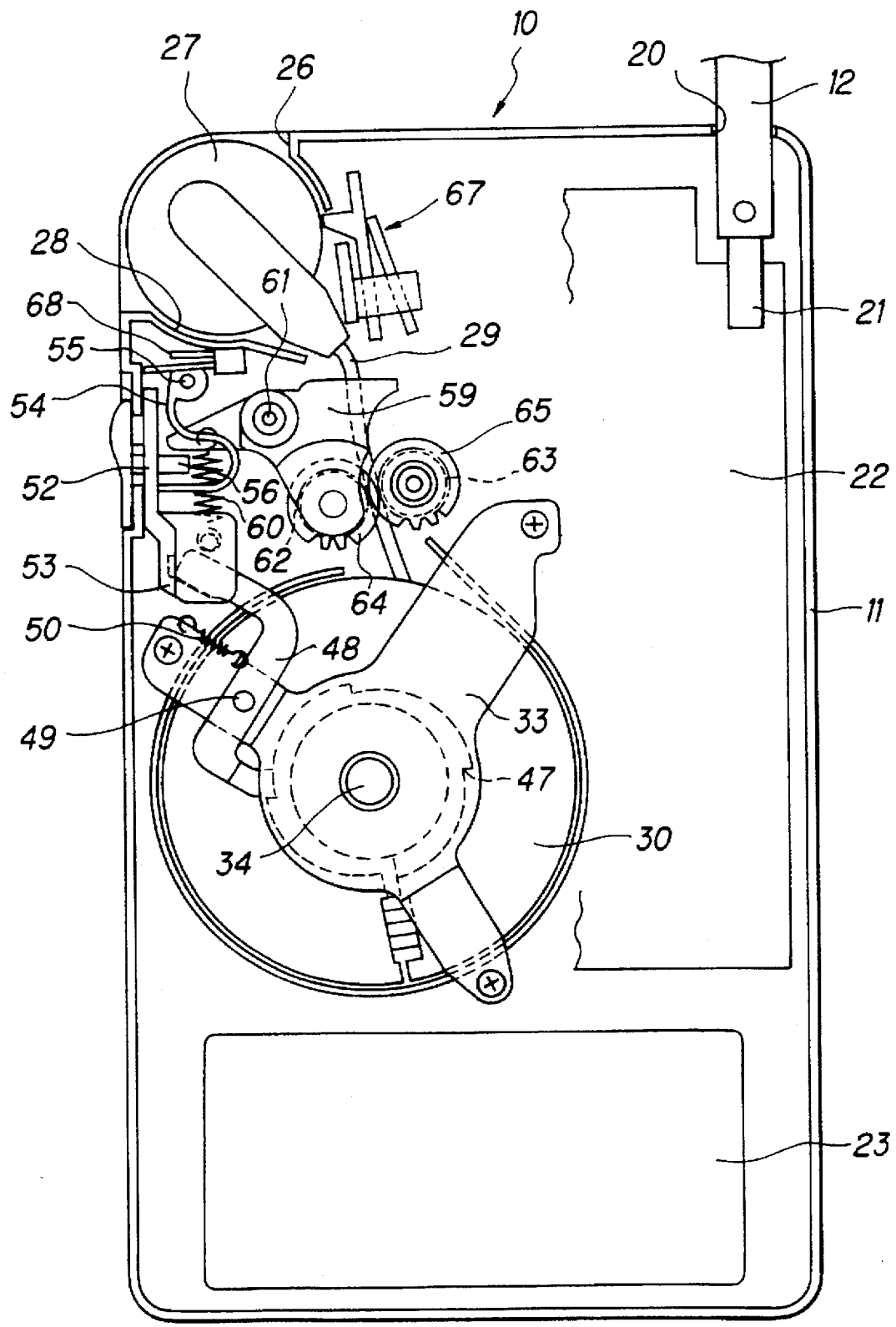
FIG. 3 is a front view of a telephone illustrating the internal structure thereof.

FIG. 3 illustrates the internal structure of the main body 10. A base portion of the antenna 12 is inserted in the cabinet 11 through a small hole 20 formed on the right side of the top of the cabinet 11 and is connected to a circuit on a printed circuit board 22 through a lug plate 21. A battery 23 such as a secondary battery is detachably contained in the cabinet 11 at the lower end portion thereof.

A notch 26 is formed on the left side of the top of the cabinet 11, and an earphone containing portion 28 for containing an earphone 27 is formed inside the notch 26. The earphone 27 constitutes the receiver portion of this telephone. A cord 29 of the earphone 27 is taken up by a reel 30 into the main body 10.

Figure 5:
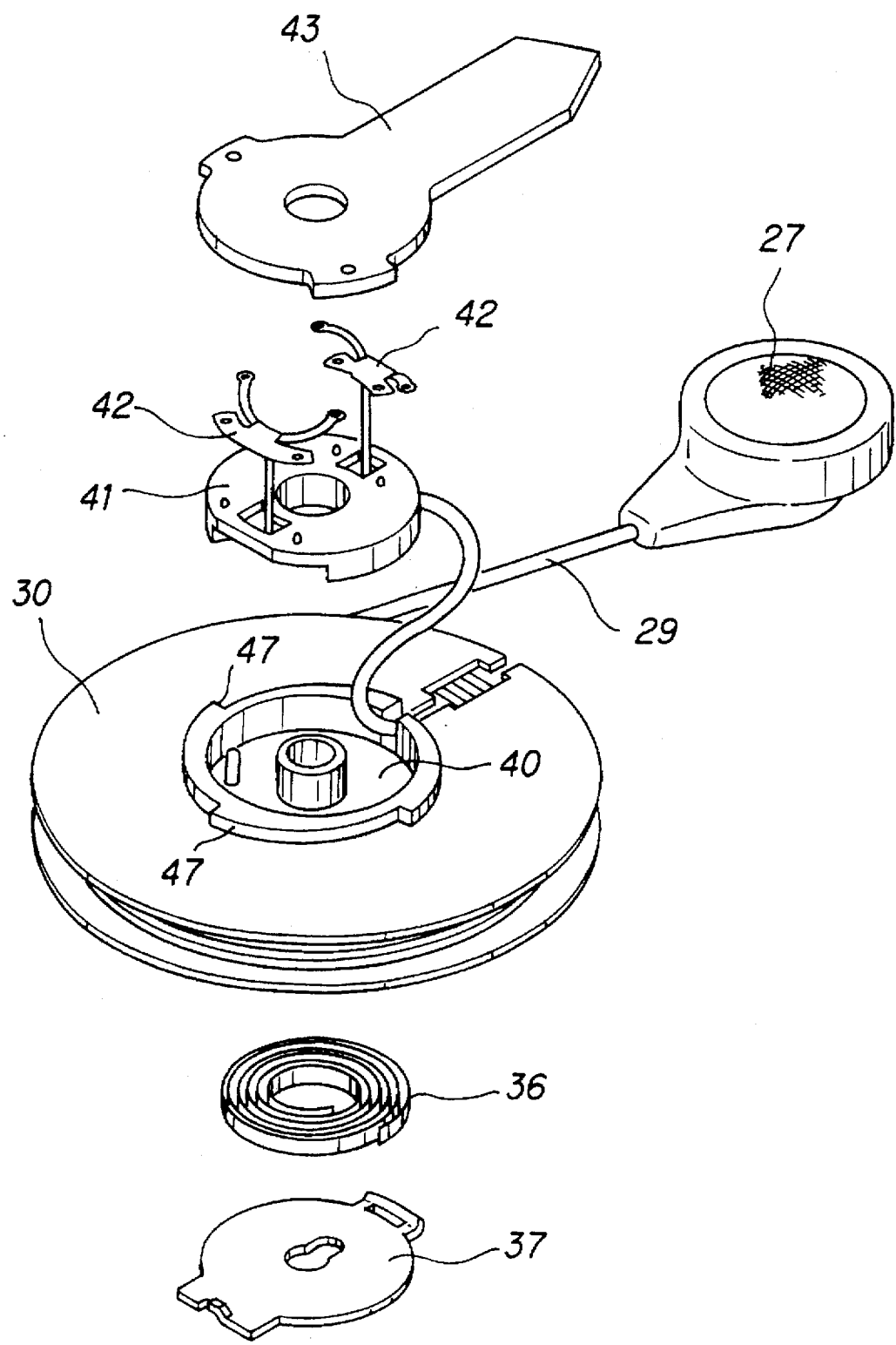
FIG. 5 is an exploded perspective view of a reel for taking up a cord.
Figure 6:
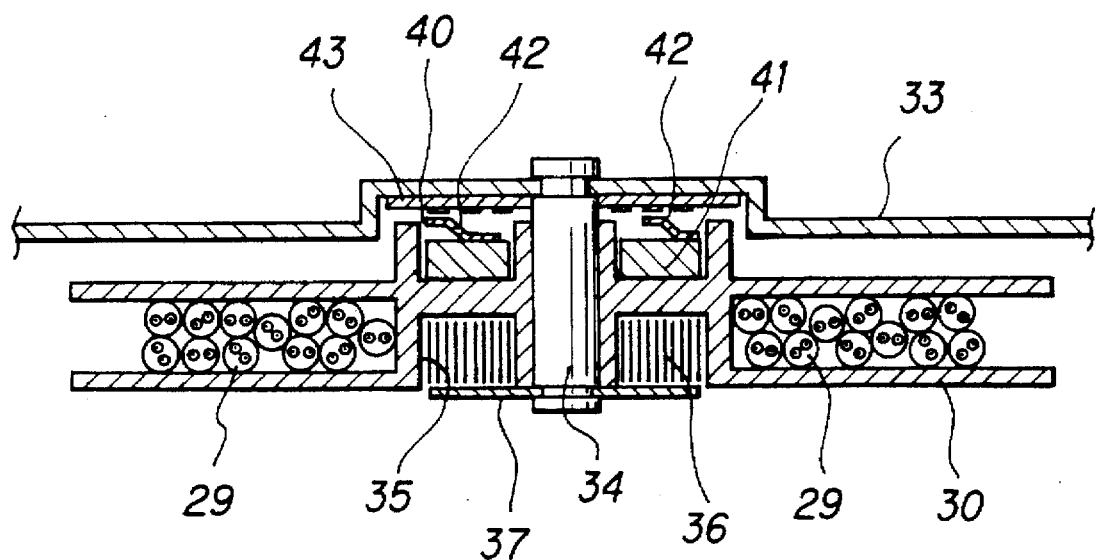
FIG. 6 is a longitudinal sectional view of a reel.

The reel 30 is supported by the cabinet 11 through a mounting plate 33. As shown in FIG. 6, a support shaft 34 is erected on the mounting plate 33. The reel 30 is rotatably supported by this support shaft 34. As shown in FIG. 5 and FIG. 6, the reel 30 has a recess 35 on the bottom thereof. A power spring 36 contained in the recess 35 accumulates energy to be used by the reel 30 for winding. The open portion of the recess 35 is closed by a lid plate 37.

Figure 7:
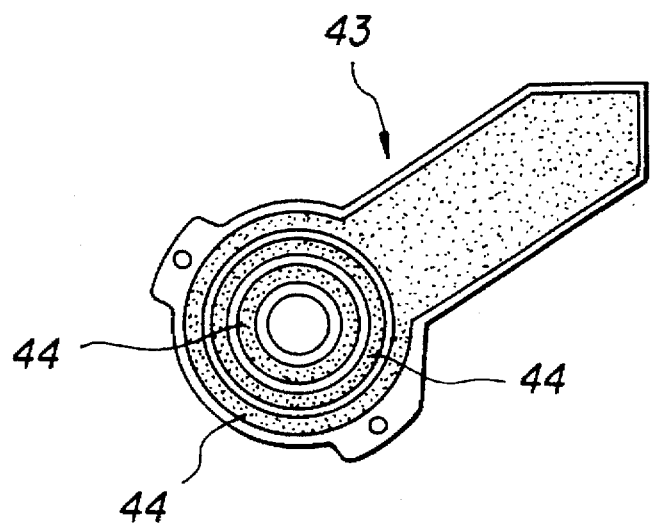
FIG. 7 is a plan view of a fixed substrate which forms part of the reel of the present invention.

An upper recess 40 is formed on the top of the reel 30, and an insulation block 41 is contained in the recess 40. The insulation block 41 supports a pair of contact springs 42. Free ends of the leading side of these springs 42 are pressed into contact with a pattern 44 constituted by slip rings on the fixed substrate 43 as shown in FIG. 7 which is disposed on the top of the reel 30. The contact between the springs 42 and the pattern 44 allows signals to be passed between the fixed side and the rotatable reel 30.

The reel 30 is urged by the power spring 36 shown in FIG. 5 and FIG. 6 for clockwise rotation about the support shaft 34 in FIG. 3. This causes the cord 29 to be taken up. As shown in FIG. 3 and FIG. 5, ratchets 47 are formed on the top of the reel 30. The ratchets 47 engages the tip of a lock lever 48. The lock lever 48 is rotatably supported by the mounting plate 33 shown in FIG. 3 through a support pin 49 and is urged by a spring 50 for counterclockwise rotation about the support pin 49.

As shown in FIG. 3, a control lever 52 is slidably retained on a side of the cabinet 11 of the main body 10. An engage rib 53 of the control lever 52 engages the base portion of the lock lever 48. The control lever 52 is provided with an elastic piece 54 bent in the form of the letter S the leading end of which is fixed to the cabinet 11 through a fixing pin 55. The control lever 52 is further provided with an urging portion 56.

A lever 59 is disposed so that it is urged by the urging portion 56 of the control lever 52 to be urged by a spring 60 for counterclockwise rotation about a support shaft 61 in FIG. 3. A guide roller 62 is rotatably supported at a portion of the lever 59 near the tip thereof. The guide roller 62 is pushed into contact with a guide roller 63 which is supported to be rotatable about a fixed shaft. These rollers 62 and 63 have gears 64 and 65, respectively, which engages each other.

A detection switch 67 is disposed at an upper portion in the interior of the cabinet 11. The detection switch 67 detects whether the earphone 27 resides in the earphone containing portion 28. Another detection switch 68 is disposed in a position near the upper end of the control lever 52 to detect the back and forth movement of the control lever 52.

Figure 8:
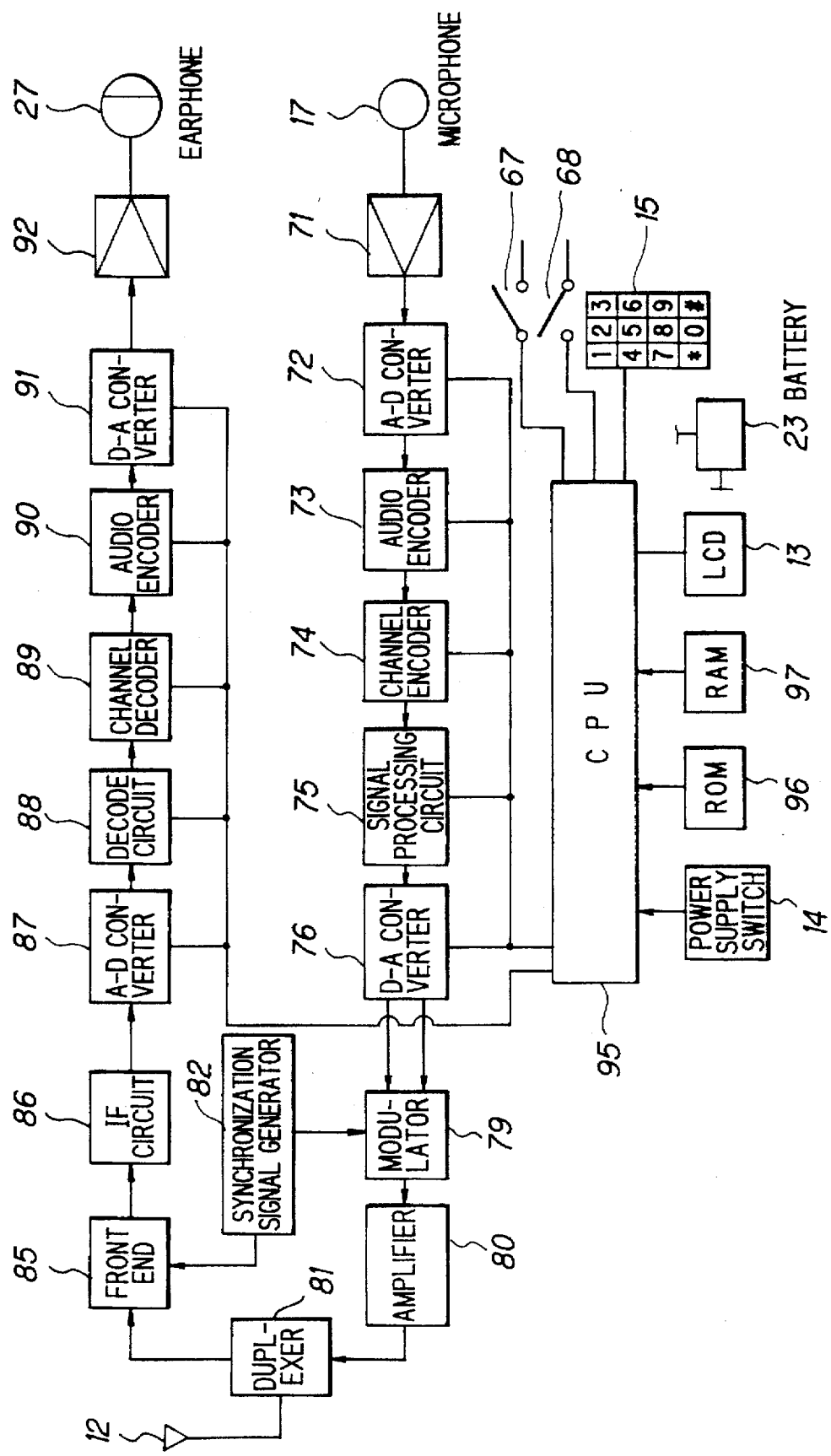
FIG. 8 is a block diagram illustrating one embodiment of the communications circuit used in the portable telephone of the present invention.

The configuration of the circuit provided on the printed board 22 in the cabinet will now be described with reference to FIG. 8. An output signal from the microphone 17 is amplified by an amplifier 71 and is supplied to an A-D converter 72. The A-D converter 72 converts the analog signal supplied by the amplifier 71 into a digital signal. The digital signal output by the A-D converter 72 is supplied to an audio encoder 73. The digital signal supplied to the audio encoder 73 is subjected to a highly efficient encoding process performed by the audio encoder 73. The digital signal output by the audio encoder 73 is supplied to a channel encoder 74. The digital signal supplied to the channel encoder 74 is subjected to a channel assigning process or added with a synchronization signal at the channel encoder 74. The output signal from the channel encoder 74 is supplied to a signal processing circuit 75. The output signal of the channel encoder 74 supplied to the signal processing circuit 75 is subjected to an error correcting coding process at the signal processing circuit 75 and is then supplied to a D-A converter 76. The output signal of the signal processing circuit 75 which has been converted into an analog signal by the D-A converter 76 is modulated into a predetermined signal format by a modulator 79, amplified by an amplifier 80, and transmitted by the antenna 12 through a duplexer 81.

The signal transmitted by the antenna 12 is demodulated by the duplexer 81, a front end 85, and an IF circuit 86, and the demodulated reception signal is supplied to an A-D converter 87. The received analog signal is converted into a digital signal by the A-D converter 87. The output signal from the A-D converter 87 which has been converted into a digital signal is supplied to a decode circuit 88 in which it is subjected to signal processing such as an error correcting process. The output signal of the decode circuit 88 is demodulated by a channel decoder 90 and is supplied to an audio decoder 90 to be decoded. The output signal of the audio decoder 90 is converted into an analog signal by a D-A converter 91, amplified by an amplifier 92, and supplied to the earphone 27. The earphone 27 outputs sounds according to the signal thus received.

A synchronization signal generator 82 having a crystal oscillator (not shown), supplies a carrier signal to the front end 85 and the modulator 79.

The above-described circuit elements used for the signal processing of the signal are controlled by a controller 95. The controller 95 is supplied with detection signals from the above-described detection switches 67 and 68 and input signals from the plurality of key switches 15. The controller 95 controls the operation of each of the circuit elements based on the detection signals from the detection switches 67 and 68 to perform switching between an on-hook state and an off-hook state.

Further, the controller 95 is connected to a ROM 96 and a RAM 97 and is supplied with output signals of the power supply switch 14. The controller 95 preferably displays required information on the display portion according to the output signals from those switches, the signals input from the key switches 15, and data on transmission and reception. The ROM 96 stores a program for a clocking operation to be described later.

The above-described controller 95 and signal processing circuit elements for transmission and reception are supplied with the required power supply voltage from the secondary battery 23.

Communication using such a portable telephone will now be described with reference to FIG. 3.

To place a call from such a telephone, the earphone contained in the earphone containing portion 28 shown in FIG. 3 is pulled out from the main body 10. By pulling the cord 29, the cord 29 wound around the reel 30 is delivered from the reel 30. At this time, the lock lever 48 which has engaged ratchet 47 of the reel 30 gets over the ratchet 47 as the reel 30 rotates counterclockwise in FIG. 3 about the support shaft 34.

The cord 29 is passed between the pair of guide rollers 62 and 63 which are in engagement with each other through the gears 64 and 65 and is pulled out through the notch 26. The pair of guide rollers 62 and 63 applies light back tension to the cord 29 as the cord 29 is pulled out so that the cord 29 is pulled out in a stable manner. When the cord 29 is released after it has been pulled out to a predetermined length, the elastic restoring force of the power spring 36 causes the reel 30 to slightly rotate in the take-up direction, i.e., clockwise about the support shaft 34 in FIG. 3, and the reel 30 is stably locked as it the next ratchet 47 engages the lock lever 48. Thus, the cord 29 is pulled out to an arbitrary length and the earphone 27 at the leading end of the cord 29 is attached to an ear of the user as shown in FIG. 1.

In conjunction with taking out the earphone 27 from the earphone containing portion 28, the detection switch 67 is switched. The output of the detection switch 67 is supplied to the controller 95 as shown in FIG. 8. Then, the controller 95 performs a clocking operation in accordance with the program stored in the ROM 96. The clocking operation of the controller 95 is performed by subtracting the data, which have been set at that time, in a register in the controller 95. The controller 95 performs a software-controlled clocking operation. The time constant in this case is set at an appropriate value preferably in the range of 2 to 5 seconds. The time interval determined by such a time constant is set to a value appropriate for pulling the cord 29 out of the main body 10 and attaching the earphone 27 to the ear.

When the time interval set by the above-described time constant has elapsed, the controller 95 switches the telephone to the off-hook state. The subsequent operations are similar to those performed on a normal portable telephone. Specifically, the key switches 15 on the surface of the cabinet 11 is operated to make a conversation with the party on the other end of the line. For reception, switchover to a reception state takes place in the off-hook state as described above. Therefore, the conversation is started in this state.

Referring again to FIG. 8, an audio signal input through the microphone 17 is amplified by the amplifier 71, A-D-converted by the A-D converter 72, converted into a predetermined signal by the audio encoder 73 and the channel encoder 74, and transmitted to the signal processing circuit 75. The signal is then D-A converted by the D-A converter 76 and is sent to the modulator 79. It is frequency-modulated by the modulator 79, amplified by the amplifier 80, and transmitted to the duplexer 81. The signal which has been transmitted to the duplexer 81 is radio-transmitted from the antenna 12.

On the other hand, a signal from the party on the other end of the line received by the antenna 12 is supplied to the front end 85 through the duplexer 81. The received signal is subjected to signal processing at the front end 85 and is thereafter demodulated into a signal having a predetermined frequency by the IF circuit 86. The signal output by the IF circuit 86 is A-D-converted by the A-D converter 87 and is then subjected to an error correcting process performed by the decode circuit 88. Further, it is demodulated into a predetermined signal by the channel decoder 89 and the audio decoder 90. The output signal from the audio decoder 90 is D-A-converted by the D-A converter 91, amplified by the amplifier 92, and output from the speaker of the earphone 27.

When the conversation is over, the earphone 27 is removed from the ear and the cord 29 to which the earphone 29 is connected is taken up by the reel 30. This operation is effected by moving the control lever 52 upwardly as shown in FIG. 4.

Such an operation causes elastic transformation of the elastic piece 54 of the control lever 52 and causes the engage rib 53 to rotate the lock lever 48 clockwise about the support pin 49 against the spring 50. As a result, the tip portion of the control lever 52 is disengaged from the ratchet 47. Thus, elastic energy accumulated in the power spring 36 when the cord 29 is pulled out causes the reel 30 to rotate clockwise about the support shaft 34, and the cord 29 is taken up into the main body 10 by the reel 30.

Figure 4:
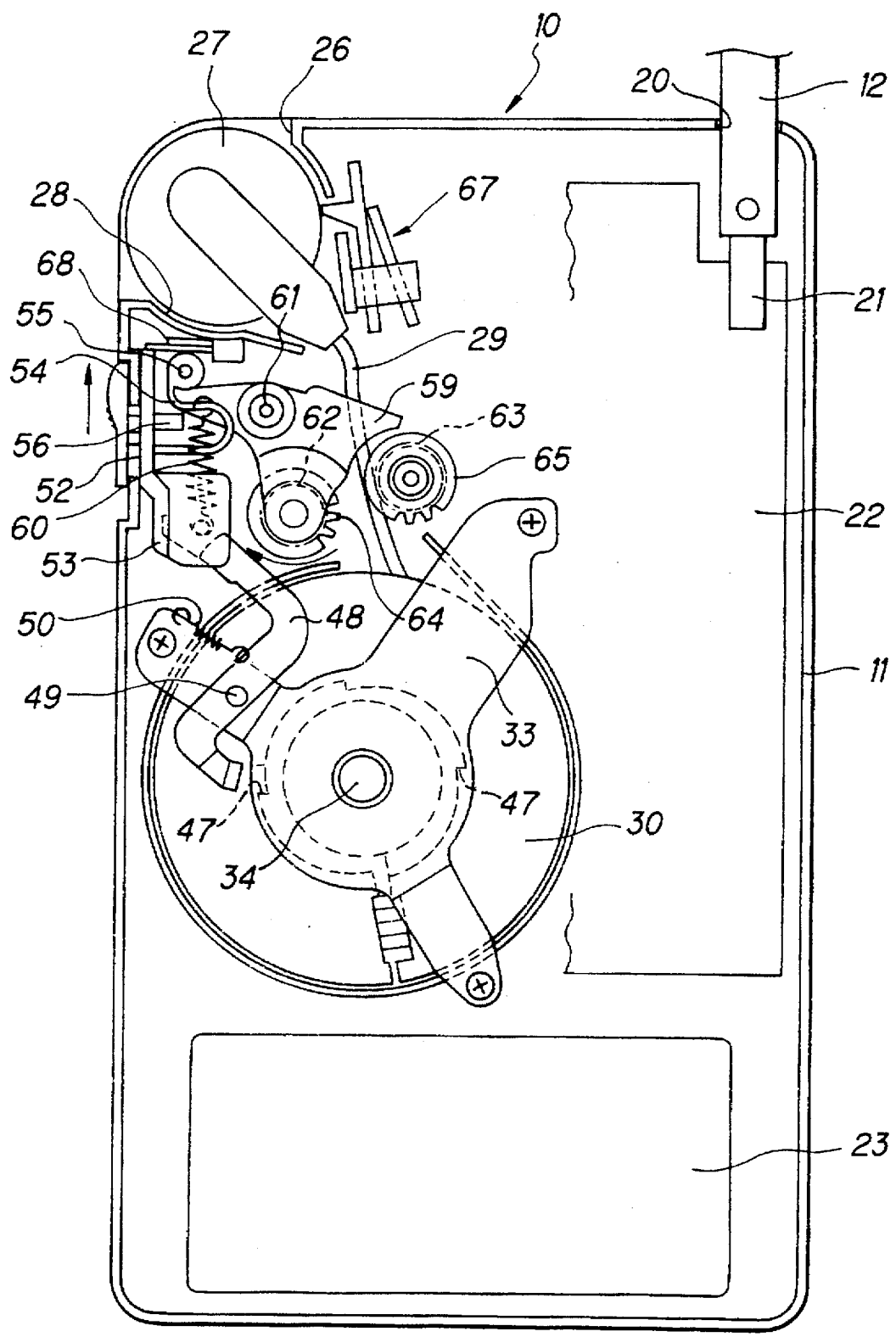
FIG. 4 is a front view illustrating a cord take-up operation.

During the operation of taking up the cord 29 as described above, the urging portion 56 of the control lever 52 causes the lever 59 to rotate clockwise in FIG. 4 about the support shaft 61. This separates the guide roller 62 from the roller 63, allowing the cord 29 to freely pass between the pair of rollers 62 and 63. Such separation of the guide rollers 62 and 63 allows the cord 29 to be taken up smoothly.

Figure 9:
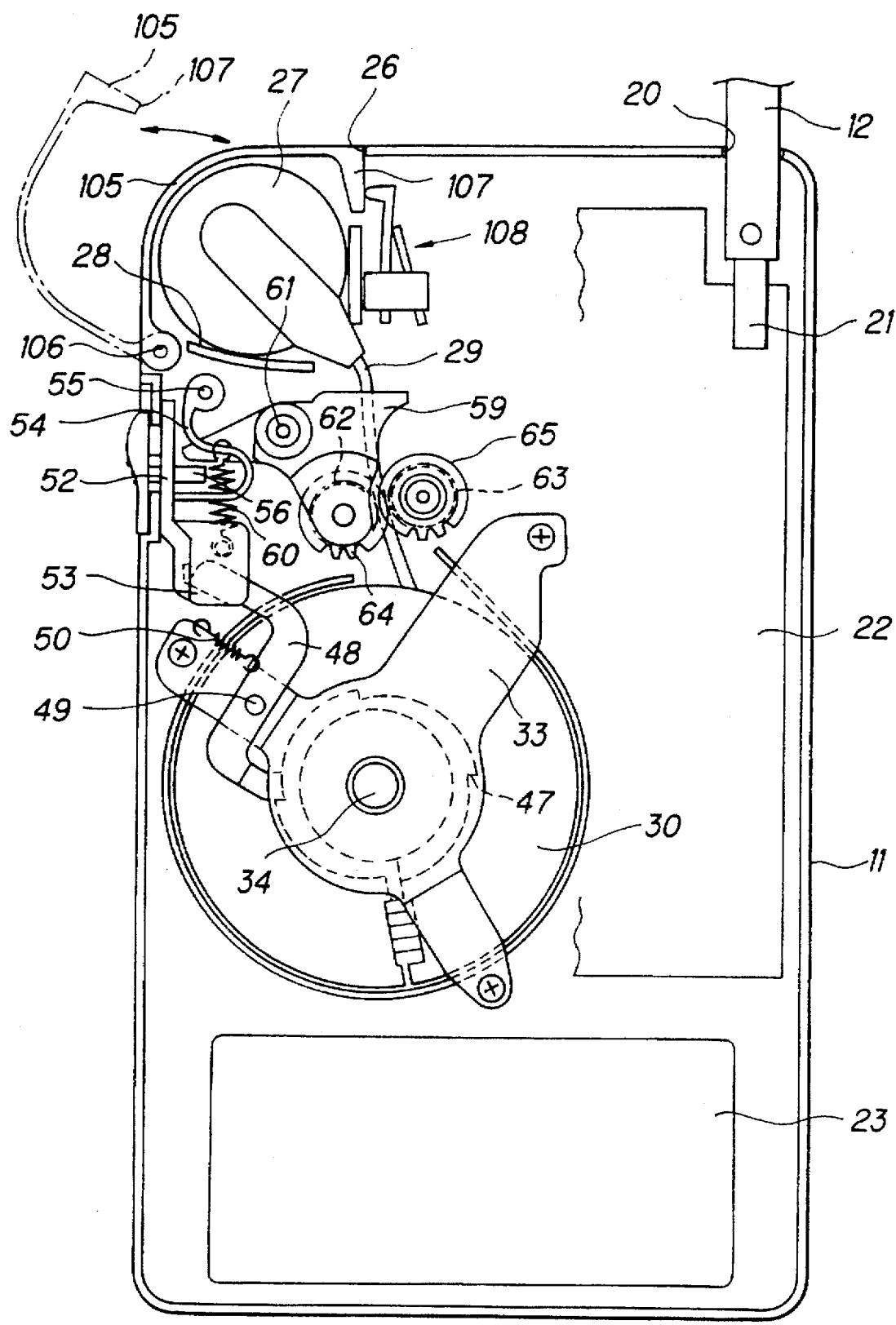
FIG. 9 is a front view of a portable telephone according to a second embodiment of the present invention illustrating the internal structure thereof.

As a result of the upward movement of the control lever 52 in FIG. 4 for taking up the cord 29 connected to the earphone 27, the tip portion of the control lever 52 pushes the detection switch 68 to close it. The output of the detection switch 68 is supplied to the controller 95 as shown in FIG. 9 to switch the telephone to the on-hook state.

Figure 2:
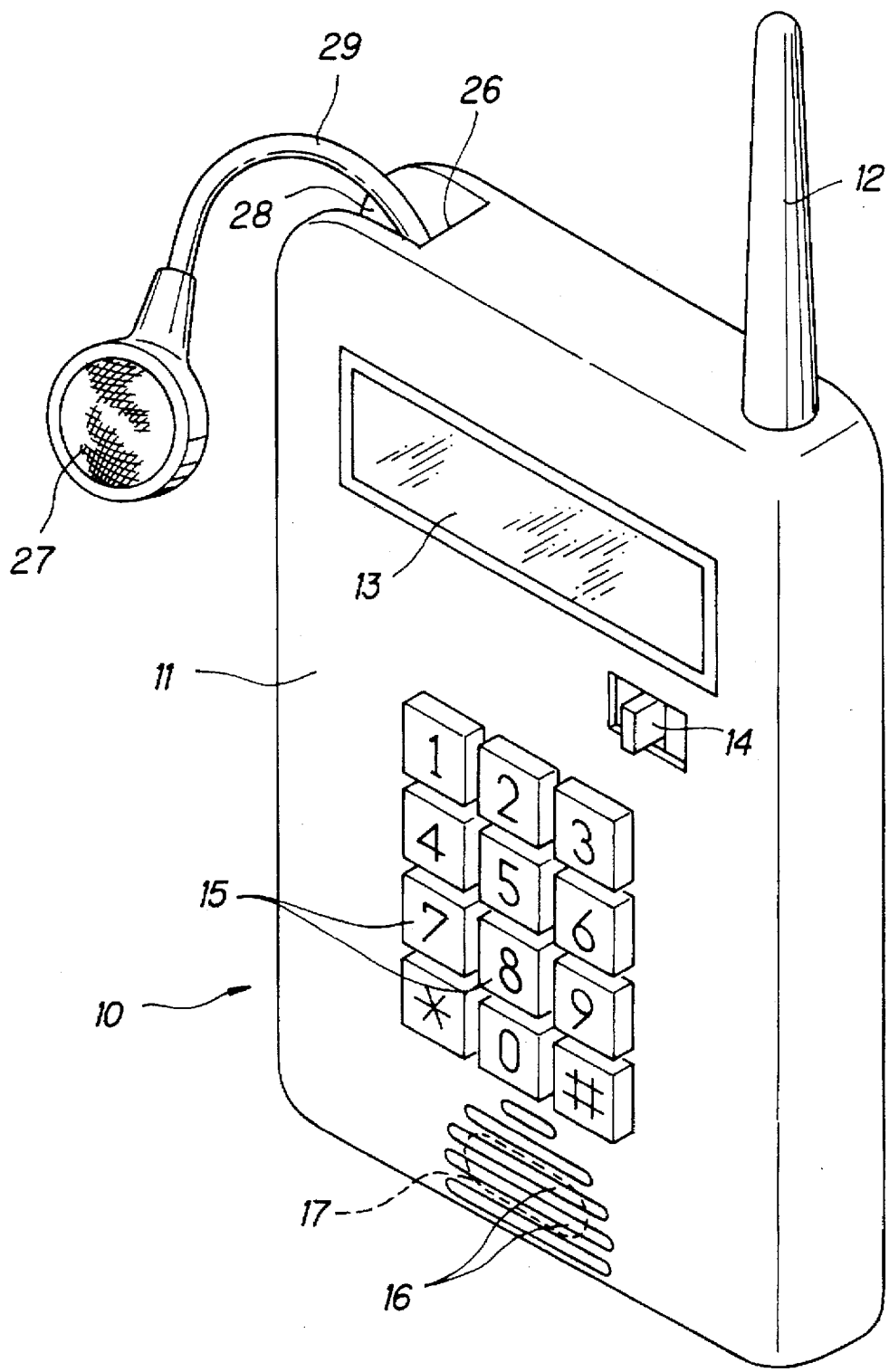
FIG. 2 is an external perspective view of the telephone in FIG. 1.

As described above, in the present embodiment, the antenna 12 required for communication is provided on the top of the cabinet 11 of the main body 10 as shown in FIG. 2; the display portion 13 and the key switches 15 are provided on the front face thereof; and the battery 23 is incorporated therein as shown in FIG. 3. Further, the small microphone 17 for communication is provided internally to the slits 16 at a lower portion of the cabinet 11. An earphone 27 of a type which is inserted in the recess of an ear is contained in the containing portion 28 on the top of the cabinet 11, and the cord 29 thereof is taken up by the reel 30. As described above, the reel 30 is adapted to automatically take up the cord 29 which has been pull out of the main body 10 by the power spring 36, the take up operation being performed in conjunction with the operation of the control lever 52.

With the portable telephone according to the present invention, to make a call, a user pulls out the earphone 27, attaches it to the recess of an ear as shown in FIG. 1, speaks to the microphone 17 with the main body 10 held by one of his or her hands, and listens to the voice of the party on the other end of the line from the earphone 28. The notch 26 serving as a pull-out port for the earphone 27 is not required to be in the position shown in FIG. 2, but may be provided at a side or a lower portion of the main body.

If this portable telephone is provided with a leaf switch 67 or the like which is actuated by the installation and removal of the earphone 27, it can operate in the same way as an actual on-hook operation and can by put in a calling mode by simply pulling out the earphone 27. This simplifies the operational steps. This telephone can be used not only as a portable telephone which is always carried around but also as a telephone for a personal handy phone system.

As described above, the telephone according to the present invention has the take-up type earphone 27 which can be contained in and pulled out from the main body 10. A user listens to the voice of the party on the other end of the line through the earphone 27 and transmits his or her voice through the built-in microphone 18 without any separate sound generator (speaker) at the main body of the cabinet 11. Further, there is provided a switching mechanism constituted by the switch 67 for enabling communication (off-hook state) in conjunction with the operation of pulling out the earphone 27.

With such a configuration, the microphone 17 and the earphone 27 can be sufficiently spaced from each other even if the cabinet 11 of the main body 10 is made compact, to thereby maintain communication quality. The main body 10 of the telephone can be hand-held so that the microphone 17 is directly in front of the mouth during communication. Further, a microphone having high directivity can be used as the microphone 17 to prevent ambient noises from being picked up. Since the voice of the party on the other end of the line can be heard from the earphone 27 which is attached to the recess of an ear, the voice can be easily heard even in a noisy environment.

Since the voice of the party on the other end of the line is output from the earphone 27, audio output can be reduced to save power consumption. In addition, information and data required during communication can be displayed on the display portion 13 on the front face of the cabinet 11. Further, since communication can be made with the antenna 12 spaced apart from the body of a user as shown in FIG. 1, there is an advantage in that the distance range is expanded.

The configuration of a portable telephone according to a second embodiment of the present invention will now be described with reference to FIG. 9. Parts that are used also in the first embodiment are given identical reference numbers and will not be described in detail. This second embodiment includes a lid element 105 provided at the area of the notch 26 in the earphone containing portion 28 on the upper left portion of the cabinet 11 containing the earphone 27. The lid element 105 is rotatably supported by a hinge pin 106 at the lower end thereof. Further, a projection 107 is provided on the lid element 105. The projection 107 is configured to push a detection switch 108. When the lid element 105 is opened, the telephone is switched to the off-hook state after a time interval corresponding to a time constant set in the same manner as in the first embodiment elapses.

When the cord 29 of the earphone 27 is taken up by the reel 30 through the operation on the control lever 52 and the lid element 105 is closed with the earphone 27 contained in the earphone containing portion 28 after communication, the projection 107 operates the switch 108 again. The operation of the projection 107 on the switch 108 results in detection of the closure of the lid element 105. The output signal from the switch 108 is supplied to the controller 95 to switch the telephone to the on-hook state. It is therefore possible to switch the telephone between the on-hook and off-hook states using only the single detection switch 108 which operates in conjunction with the opening and closing of the lid element 105.

The present invention is not limited to the configurations in the above-described embodiments and may be implemented in various forms within a scope which does not significantly deviate from the principle of the present invention. For example, the earphone serving as a transducer is not limited to that shown in FIG. 2 and may be an earphone having an insertion portion which projects from the main body of the earphone and which is inserted in an external acoustic meatus. The cord take-up mechanism may be configured to allow the cord to be manually taken up by rotatably providing a handle coupled to the reel on the main body of the telephone.

While specific illustrated embodiments have been shown and described, it will be appreciated by those skilled in the art that various modifications, changes and additions can be made to the invention without departing from the spirit and scope thereof as set forth in the following claims.

What is claimed is:

1. A portable telephone comprising:
    a transducer earphone;
    a main body of said portable telephone removably housing said transducer earphone and fixedly housing a microphone;
    a cord connecting said transducer earphone and said main body;
    take-up means for taking up said cord into said main body; and,
    switching means for switching between an on-hook state and an off-hook state of said portable telephone in conjunction with removal of said cord from said main body and the taking up of said cord by said take-up means, said switching means comprising:
    a first switch for setting said off-hook state, said first switch being actuated by removing said transducer earphone from said main body; and,
    a second switch for setting said on-hook state, said second switch being actuated upon commencement of the taking-up movement of said cord.

2. The portable telephone according to claim 1, wherein said take-up means comprises a reel rotatably mounted in said main body, an urging member for urging said reel in a take-up direction of said cord, a blocking mechanism for blocking the rotation of said reel in said take-up direction against said urging member, and a releasing mechanism for releasing the blockage of the rotation of said reel by said blocking mechanism, said second switch being triggered by the releasing operation of said release mechanism.

3. The portable telephone according to claim 1, further comprising delay means for delaying setting said off-hook state for a predetermined time after said first switch is operated by removal of said transducer earphone so that the user is given sufficient time to pull said cord before setting the off-hook state.

* * * * *